United States Patent [19]

Carmien et al.

[11] 3,917,421
[45] Nov. 4, 1975

[54] INSERT FOR ATTACHING FIBERGLASS TOOL HANDLES

[75] Inventors: Joseph Allen Carmien, Beverly Hills; John R. Yuhos, Van Nuys, both of Calif.

[73] Assignee: Nupla Corporation, Sun Valley, Calif.

[22] Filed: May 28, 1974

[21] Appl. No.: 473,724

[52] U.S. Cl. ............... 403/12; 403/268; 403/361; 145/29 R
[51] Int. Cl.² .................. B25G 3/34; F16B 11/00; F16B 12/04; F16L 41/00
[58] Field of Search ......... 403/268, 25, 11, 361, 12; 145/29 R, 29 B, 36; 248/188, 188.3, 188.8

[56] References Cited
UNITED STATES PATENTS

| | | | |
|---|---|---|---|
| 2,755,114 | 7/1956 | Becker | 403/361 |
| 2,868,602 | 1/1959 | Drezner | 248/188.8 X |
| 3,355,226 | 11/1967 | Portz | 145/29 R X |

*Primary Examiner*—Werner H. Schroeder
*Assistant Examiner*—Wayne L. Shedd
*Attorney, Agent, or Firm*—Robert C. Comstock

[57] ABSTRACT

An insert for use in aligning fiberglass tool handles for attachment to tool heads and for making other fiberglass connections. A resilient molded plastic insert has a center portion and a plurality of legs extending outwardly from the edges of the center portion. The insert is mounted within a tool head opening so that the legs are disposed between the handle and the walls of the opening. The insert holds the handle in proper position perpendicular to the tool head and equally spaced from the sides of the eye opening of the head. The insert eliminates the necessity for jigs to hold the tool head and/or handle during curing of potting compound inserted into the eye opening. The insert is not removed, but is incorporated into the tool head during the attachment operation.

7 Claims, 6 Drawing Figures

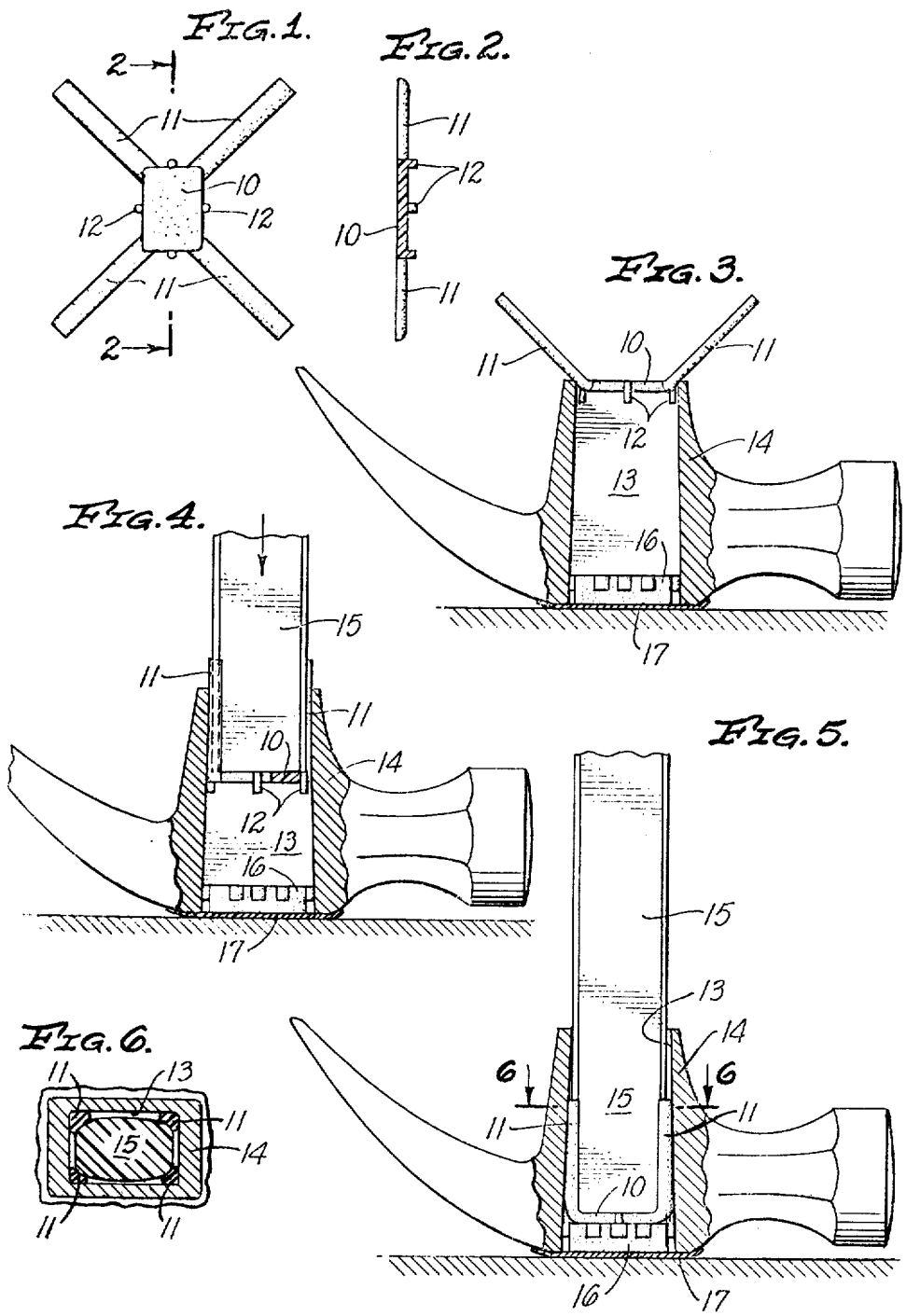

INSERT FOR ATTACHING FIBERGLASS TOOL HANDLES

BACKGROUND OF THE INVENTION

1. Field of the Invention

The invention relates to an insert for aligning when attaching fiberglass handles to tools such as hammers, sledges, axes, lopping shears, etc., and for making other fiberglass connections.

2. Description of the Prior Art

Handles made of wood are designed to fit into a tool eye by being driven until compressed. Because the wood is in complete contact with the sides of the eye hole, the handle is properly aligned. When a handle is attached by use of an adhesive, as a fiberglass handle must be, the portion of the handle which is inside the eye hole must be smaller than the hole size of the eye in order to allow for a glue line. This glue line space creates a need of proper handle/head alignment.

At the present time, special jigs must be used to hold the tool head and handle against movement with respect to each other during the curing of the potting adhesive. Since the potting compound requires one or more hours to dry and cure, a large number of special jigs is required, with a high financial investment in such special tooling and factory space.

Tool handle attachment with the methods and devices now in use is accordingly costly in equipment, labor, time and factory space.

Another difficulty with the present methods and equipment is that the assembled tools must be kept in their jigs during the entire curing operation. Production is accordingly limited by the number of available jigs, their space requirements, etc.

SUMMARY OF THE INVENTION

The present invention provides a simple resilient molded insert which is adapted to be disposed within the tool head opening at the time the handle is inserted. The insert has integral portions which fit between the handle and the walls of the tool head opening to hold the handle and tool head in proper and stationary relationship with respect to each other. The insert thereby completely eliminates and replaces the cumbersome and expensive special jigs which are now required.

It is accordingly among the objects of the invention to provide an insert having all of the advantages and benefits set forth above and described hereinafter in this specification.

Another object of the invention is to provide an insert of the type described which is adapted to be inserted into the tool head opening simultaneously with the handle, being engaged and inserted by the end of the handle.

It is a further object of the invention to provide such an insert which is adapted to compensate for variations in the dimensions and tolerances of the tool head opening and/or handle.

Another object of the invention is to provide such an insert which acts to prevent lateral movement of the handle within the tool head opening in any direction and which prevents twisting movement as well.

Still another object of the invention is to provide such an insert which may be manufactured economically by a single molding operation and which is simple and rapid to insert and use.

In essence, the invention contemplates an insert which fits between the handle and tool head opening and which acts to hold these members in proper perpendicular relationship and immobile with respect to each other during the curing operation. In a preferred embodiment of the invention, the insert has integral portions which are automatically moved into position within the corners of the tool head opening upon insertion of the handle. The invention also comprises such other objects, advantages, and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a top plan view of the insert;

FIG. 2 is a sectional view of the same taken on line 2—2 of FIG. 1;

FIG. 3 is a side elevational view partly broken away and shown in section of a tool head with the insert disposed within the tool head opening prior to insertion of the handle;

FIG. 4 is a view similar to FIG. 3, showing the handle partially inserted and the insert in position adjacent the corners of the handle;

FIG. 5 is a view similar to FIG. 3, showing the handle fully inserted within the tool head opening;

FIG. 6 is a sectional view taken on line 6—6 of FIG. 5.

Potting compound, which would normally be disposed within the tool head opening at the time the handle is inserted, is omitted from FIGS. 4–6 of the drawings for clarity of illustration.

DESCRIPTION OF THE PREFERRED EMBODIMENT

A preferred embodiment which has been selected to illustrate the invention comprises an insert which may conveniently be molded and which is preferably formed of elastomeric material such as polyvinyl chloride or other material having suitable resilient properties.

The insert has a substantially rectangular center portion 10, which is flat on both sides. Extending radially and diagonally outwardly from the four corners of the center portion 10 are four elongated straight legs 11. The legs 11 are substantially equal in thickness to the center portion 10. The upper surfaces of the legs 11 are flat, while the lower surfaces are rounded. The legs 11 are accordingly substantially semi-circular in cross-section.

A plurality of small integral spacers 12 are disposed around the center portion 10. In the embodiment shown, one spacer 12 is disposed adjacent to the midportion of each of the four sides of the center portion 10. The spacers 12 are substantially circular in cross-section. The spacers 12 are substantially thicker than the center section 10 and have ends which protrude somewhat beyond the lower surface of the center portion 10 to assist in the initial insertion and alignment of the center portion within the tool head eye opening.

The structure shown in the drawings and described above is adapted for use in a tool head opening which is substantially rectangular in shape, with a substantially rectangular handle. Other tool head openings and handles may have other shapes and configurations and the shape and configurations of the insert may vary accordingly, so that the insert is complementary to the configuration of the tool head opening and handle with which it is used. The shape or configuration of the insert is not critical, so long as the proper result is achieved and the purpose of the insertion is served. This result and purpose are to hold the handle and the tool head in correct immobile relationship to each other without the use of special tools during the time the potting compound is cured.

As shown in FIG. 3 of the drawings, the insert is preferably dimensioned to fit within the inner end of a handle receiving tool head opening 13 formed within a tool head 14. The sides of the spacer 12 should preferably frictionally and resiliently engage the inner side walls of the opening 13. The spacers 12 are directed inwardly toward the opposite end of the opening 13.

As shown in FIG. 4 of the drawings, the end of a fiberglass tool handle 15 is inserted into the opening 13. The flat end of the handle 15 engages one side of the center portion 10 and moves the insert into the opening 13 as the handle 15 is inserted. As the insert moves into the opening 13, the four legs 11 are automatically bent inwardly to lie substantially flat against the corners of a handle 15 in parallel relationship to the handle.

The cross-sectional configuration of the handle 15 is shown in FIG. 6 of the drawings. Its short sides are straight, while its long sides are slightly rounded. The corners may be beveled to make a better fit with the adjacent flat surfaces of the legs 11.

It will be seen from FIG. 6 of the drawings that the legs 11 fit snugly into the corners of the opening 13. In doing so, they act to prevent any movement of the handle in either lateral direction or any combination thereof such as diagonal movement or twisting.

It should be understood that the invention is not to be limited to such a corner arrangement exclusively and that other arrangements may be used. For example, the insert may be provided with integrally formed portions which extend between the sides of the handle and the sides of the inner walls of the tool head opening. The number of legs or similar members used may also be varied as desired from a minimum of one to a maximum of any feasible number.

The dimensions of the tool head opening in particular and sometimes those of the tool handle as well are customarily not held to close tolerances by the manufacturers. However, the flexible insert of the present invention is capable of compensating for all possible combinations of dimensional variations and tolerances of both the tool head opening and tool handle.

As shown in FIGS. 3–5 of the drawings, the present invention is adapted to be used in combination with an end plug mounted in the outer end of the opening 13 to provide a finished appearance for the tool. A piece of masking tape 17 extends over the end plug 16 and closes off the end of the opening 13. The opening 13 accordingly serves as a mold for holding the potting compound which permanently attaches the handle 15 to the tool head 14.

The potting compound is preferably inserted into the opening 13 prior to insertion of the insert and handle. The handle is then inserted, preferably slowly, in the manner shown in FIGS. 4 and 5 of the drawings. After the handle 15 has been inserted to the position shown in FIG. 5 of the drawings, all of the free spaces within the opening 13 are filled with potting compound. The tool then need not be placed in any special jig or holding device of any kind. It should preferably remain in the vertical position shown in FIG. 5 at least until the potting compound is no longer in liquid form. The insert, however, acts as all of the holding and positioning means required during curing of the potting compound.

I claim:

1. An insert for use in attaching a tool handle of fiberglass or the like to a tool head having a handle receiving opening, said insert being adapted to hold said handle temporarily in a fixed position with respect to said tool head during the curing of potting compound within said opening which forms a permanent bond between said handle and tool head, said insert being formed of a single piece of molded resilient material, said insert comprising a flat solid center portion having a peripheral configuration substantially corresponding to the peripheral configuration of the head carrying end of said handle, and a plurality of legs each connected at one end thereof to said center portion, said legs extending radially outwardly from said center portion in the same plane as said center portion prior to insertion of said insert into said handle receiving opening, said insert being movable into said opening by the end of said handle when said handle is inserted into said opening, said legs engaging the inner walls of said opening and being bent at a right angle along the area of their connection to said center portion, so that said legs extend parallel to said handle between the inner side walls of said opening and the outer side walls of said handle, said legs resiliently engaging the adjacent sides of said handle and opening to hold said handle in position with respect to said tool head.

2. The structure described in claim 1, said center portion being substantially equal dimensionally to the cross-section of said opening and being adapted to extend transversely across said opening, said center portion being constructed and arranged for frictionally engaging the inner periphery of said opening to hold said insert in position within said opening prior to the insertion of said handle.

3. The structure described in claim 2, said center portion being rectangular, said insert having four legs extending diagonally outwardly from the four corners of said center portion, said opening being substantially rectangular and said legs being adapted to fit within the corners of said opening.

4. The structure described in claim 3, each of said legs having a flat side adapted to engage the side of said handle and a rounded side adapted to engage a corner of said opening.

5. The structure described in claim 4, said center portion having a plurality of small integrally formed spacers extending continuously around its periphery, the outer surfaces of said spacers being adapted to engage the inner periphery of said opening.

6. The structure described in claim 5, said insert including said center portion and legs comprising a single piece of flat molded plastic material.

7. The structure described in claim 6, said spacers having projections extending into said opening beyond said center portion to assist in guiding and holding said insert in said openings.

* * * * *